Figure 2:

(No Model.)  2 Sheets—Sheet 1.
H. C. SEELY.
RECORD.

No. 401,661. Patented Apr. 16, 1889.

Fig. 1.

WITNESSES.
Wilbur Powell.
J. B. McGirr.

INVENTOR.
Horace C Seely
By Connolly Bros
attys (No Model.)  H. C. SEELY.  2 Sheets—Sheet 2.
RECORD.

No. 401,661.  Patented Apr. 16, 1889.

WITNESSES
Will M. Powell.
J. B. McGinn.

INVENTOR,
Horace C. Seely
By Connolly Bros
Attys.

UNITED STATES PATENT OFFICE.

HORACE C. SEELY, OF PHILADELPHIA, PENNSYLVANIA, ASSIGNOR OF ONE-HALF TO JAMES ARNOLD, OF SAME PLACE.

RECORD.

SPECIFICATION forming part of Letters Patent No. 401,661, dated April 16, 1889.

Application filed June 10, 1886. Renewed July 2, 1888. Serial No. 278,881. (No specimens.)

*To all whom it may concern:*

Be it known that I, HORACE C. SEELY, a citizen of the United States, residing at Philadelphia, in the county of Philadelphia and State of Pennsylvania, have invented certain new and useful Improvements in Records, &c.; and I do hereby declare the following to be a full, clear, and exact description of the invention, reference being had to the accompanying drawings, which form part of this specification, in which—

Figure 1 is a plan view of a record with one of the supplemental leaves partially turned over. Fig. 2 is a sectional view of a record.

My invention relates to registers, records, and other books in which one index, set of names, numbers, or other list of persons or things is kept, and opposite to which are set various items of information.

The object of my improvements is to economize space and save time in making entries by providing means whereby the duplication or repetition of the lists on different pages may be avoided.

My invention consists in the combination, with a main sheet adapted to receive a list of names, numbers, or other registry, of a set or series of supplemental leaves sewed or otherwise fastened to said main sheet in such manner that each of said supplemental leaves may be brought into registration with the list on the main sheet, substantially as hereinafter described.

Referring to the accompanying drawings, A represents a book or record embodying my invention.

B is the main sheet, *a* designating the inner and *b* the outer edge thereof, which in practice would be the first sheet, and is preferably ruled or lined in such manner as to be adapted to have a list of names, C, or other like entry made upon it. Such list may, for example, be a list of scholars attending school, and it is desired to have columns corresponding with the names in which various items of information—such as marks for attendance, conduct, studies, &c.—are to be set or entered. Heretofore it has been the practice in such cases to repeat the list of names on every page of the book, as the indicating-marks are put down at the various periods of time or referring to different circumstances. This practice involved the labor of writing the list of names on every page, and also involved the use of a considerable amount of paper due to such repetition.

D represents a series of supplemental leaves, which are attached or fastened to or on the main sheet at one side of the center, as at *d*, said supplemental leaves being of such width and so located that they may be folded or turned upon the main sheet and brought into registration or line with the list thereon. To permit this folding there must be between the list on the main sheet and the stitched or fastened edge of the supplemental sheets a sufficient space left so that when the supplemental sheets are turned the list will not be covered, but will be exposed. In practice this space may be used for the first series of entries required in keeping the record, and the successive entries may be made on the first and successive pages of the supplemental leaves, as they are turned over for that purpose.

What I claim as my invention is—

In a record or register, the combination, with a main sheet adapted and designed to receive a list of names or other entries, of a series of supplemental folded sheets attached or fastened to the main sheet near the outer edge thereof, and adapted and designed to be successively turned over and to receive entries referring to the list on the main sheet, substantially as shown and described.

In testimony that I claim the foregoing I have hereunto set my hand this 20th day of May, 1886.

HORACE C. SEELY.

Witnesses:
   M. D. CONNOLLY,
   R. DALE SPARHAWK.